United States Patent
Kim et al.

(10) Patent No.: US 7,911,542 B2
(45) Date of Patent: Mar. 22, 2011

(54) DISPLAY DEVICE AND METHOD FOR LABELING AV SIGNAL INPUT SOURCES

(75) Inventors: In Hoon Kim, Daegu (KR); Seung Jin Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 788 days.

(21) Appl. No.: 11/024,963

(22) Filed: Dec. 30, 2004

(65) Prior Publication Data

US 2005/0190303 A1     Sep. 1, 2005

(30) Foreign Application Priority Data

Dec. 31, 2003   (KR) .................. 10-2003-0101468

(51) Int. Cl.
*H04N 5/268*   (2006.01)
*H04N 5/50*   (2006.01)

(52) U.S. Cl. .................. 348/706; 348/569; 348/563

(58) Field of Classification Search .......... 348/705–706, 348/569, 570, 731–733, 563–564
See application file for complete search history.

(56) References Cited

U.S. PATENT DOCUMENTS

| | | | |
|---|---|---|---|
| 5,212,553 A | * | 5/1993 | Maruoka .................. 725/68 |
| 5,253,067 A | * | 10/1993 | Chaney et al. ............ 348/570 |
| 5,621,456 A | | 4/1997 | Florin et al. |
| 6,122,018 A | * | 9/2000 | Sugihara et al. ............ 348/705 |
| 6,172,674 B1 | * | 1/2001 | Etheredge ................... 715/721 |
| 2004/0194132 A1 | * | 9/2004 | Kawashima et al. ........ 725/37 |
| 2005/0262535 A1 | * | 11/2005 | Uchida et al. ............... 725/80 |
| 2007/0083888 A1 | * | 4/2007 | Liebhold .................... 725/37 |

FOREIGN PATENT DOCUMENTS

| | | |
|---|---|---|
| CN | 1256842 A | 6/2000 |
| JP | 2001-007824 | 1/2001 |
| WO | WO 98/47283 | 10/1998 |

OTHER PUBLICATIONS

Chinese Office Action dated Jul. 6, 2007.
Chinese Office Action dated Mar. 17, 2010.

* cited by examiner

*Primary Examiner* — M. Lee
(74) *Attorney, Agent, or Firm* — Ked & Associates LLP

(57) ABSTRACT

A display device and a method for labeling input sources are disclosed, to set and provide label information of the input sources on a screen of the display device, for a user's convenience, in which the display device includes a plurality of input terminals respectively connected to a plurality of input sources, a controller configured to display a menu of setting label information of the input sources on a screen, and to display the corresponding label information along with an image of the input source selected by a user; and a memory configured to store the received label information of the input sources.

26 Claims, 5 Drawing Sheets

DISPLAY DEVICE AND METHOD FOR LABELING AV SIGNAL INPUT SOURCES

CROSS-REFERENCE TO RELATED APPLICATIONS

This application claims the benefit of Korean Patent Application No. P2003-101468, filed on Dec. 31, 2003, which is hereby incorporated by reference as if fully set forth herein.

BACKGROUND OF THE INVENTION

1. Field of the Invention

The present invention relates to a display device, and more particularly, to a display device and a method for labeling a plurality of AV signal input sources.

2. Discussion of the Related Art

Generally, a television is provided with external input terminals for receiving various inputs from a video 1, a video 2, a component 1, a component 2, and a RGB, as well as a sky wave, that is, a RF (radio frequency) through an antenna. In this state, the television receives video and audio signals from the external input terminals, and outputs image and voice. Accordingly, a user can use various external devices of a VCR, a cable, a game, a DVD, and a set-top box connected with the respective external input terminals.

However, if the user cannot memorize respective connections between the external input terminals and the external devices, the user cannot directly change the external device to a desirable input source. For example, if the user desires to watch the DVD, the user cannot directly change to the corresponding input source. That is, there is requirement for sequentially selecting the respective input sources by using a remote control key, and checking the image according to the selected input source. Also, on inputting the input source, the image of the presently selected input source is displayed on a screen of the television. However, it is impossible for the user to check that the displayed image of the selected input source is outputted from which of the external devices.

In the television according to the related art, the user has to check the external device connected by the input terminal of the television and a signal line, for selection of the desirable input source.

SUMMARY OF THE INVENTION

Accordingly, the present invention is directed to a display device and a method for labeling AV input sources that substantially obviates one or more problems due to limitations and disadvantages of the related art.

An object of the present invention is to provide a display device and a method for labeling AV input sources, in which identification information of the AV input sources are provided on a display screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a plurality of input terminals respectively connected to a plurality of input sources; a controller configured to display a menu of setting label information of the input sources on a screen, and to display the corresponding label information along with an image of the input source selected by a user; and a memory configured to store the received label information of the input sources.

The menu includes a list of options for selecting one of pre-stored representative identifications of the input source, or includes an input field for manually inputting representative identification of the input source.

The label information includes representative identifications of the input sources, and further includes at least one of manufacturer of the input source, a serial number, and a format of data to be outputted from the input source.

The memory stores input terminal information. The input terminal information includes at least one of titles of the input terminals, a data format suitable for each of the input terminals, and a kind of the input sources suitable for each of the input terminals.

The controller displays an image of the input source selected by the user and the stored label information of the selected input source on the screen.

In addition, the display device further includes a switch for selecting one of signals received from the input sources, and a signal processor for converting an image of the input source selected by a user and the stored label information of the selected input source into a displayable signal.

In another aspect, a display device includes a memory configured to store representative identifications (IDs) of a plurality of input sources corresponding to a plurality of input terminals and system information of the input sources; and a controller for displaying the ID of the selected input source and the system information of the selected input source on a screen.

In another aspect, a method for labeling input sources includes displaying a menu for labeling a plurality of the input sources on a screen; setting representative IDs of the input sources corresponding to a plurality of input terminals and system information of the input sources by using the menu; and storing the set representative IDs and the set system information in a memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
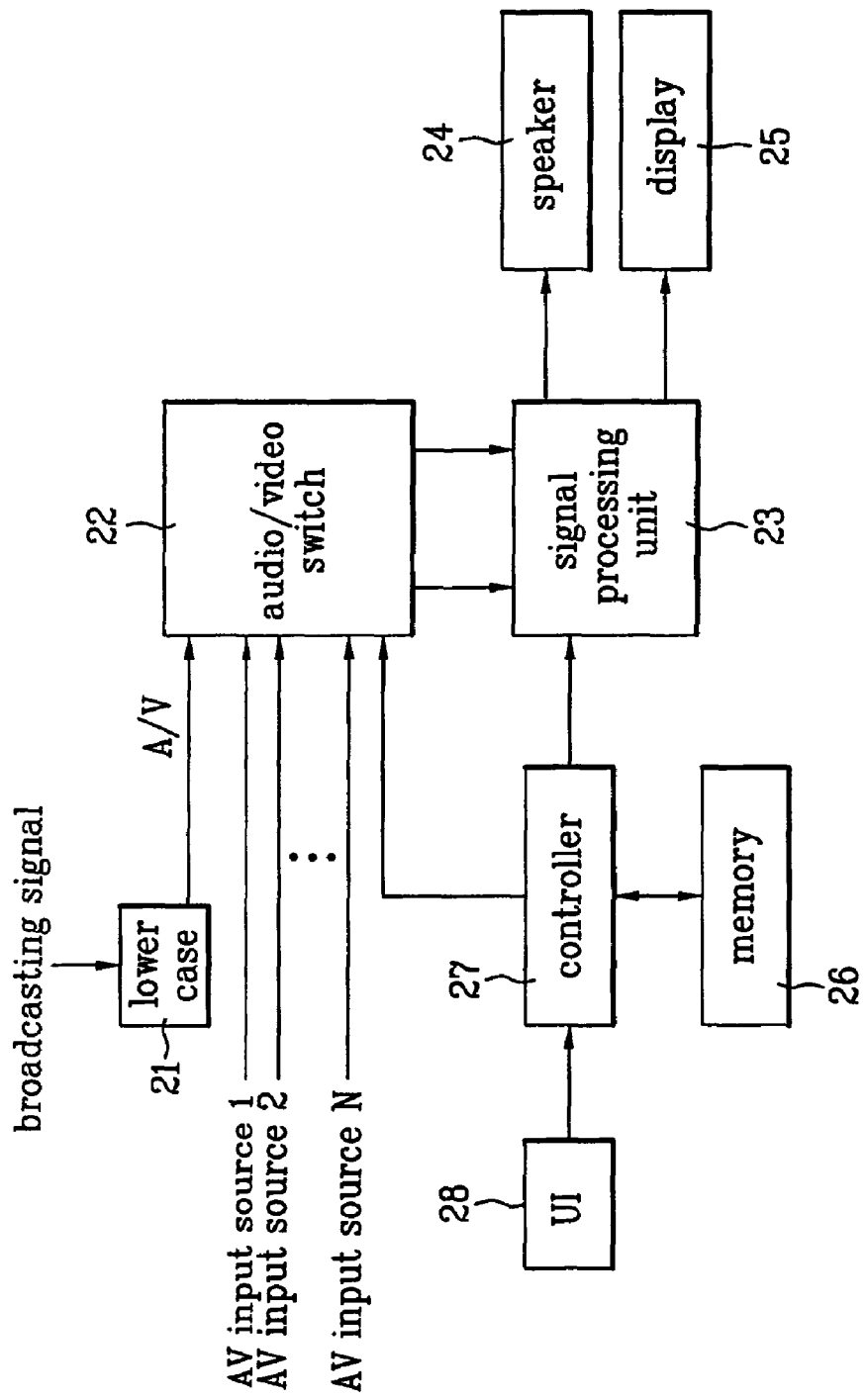
FIG. 1 illustrates a block diagram of showing a structure of a television having an input source labeling function according to the present invention.

FIG. 1 illustrates a display device (e.g., a television system) having an input source labeling function according to the present invention. As shown in FIG. 1, a tuner 21 tunes a terrestrial or cable broadcasting signal. Then, an audio/video switch 22 receives audio and video signals (AV signals) from various AV input sources (external devices), as well as the turned signal outputted from the tuner 21, and selects any one among the received signals, and then outputs the selected signal. For example, the audio/video switch 22 selects one of the AV signals from a VCR (video cassette recorder), a cable box, a video game system, a DVD (digital video disc) player, a set-top box, a camcorder, and a computer, and then outputs the selected signal. The signals received by the audio/video switch 22 include at least one of video, voice, supplemental information, and text data.

A controller 27 displays a menu for labeling the AV input sources on a display unit 25. Also, if a user inputs representative identifications (IDs) of the AV input sources and a system information of the AV input sources, the controller 27 stores the inputted the representative identifications and the system information in a memory 26. For example, the system information of the AV input sources includes a system type, a manufacturer, a serial number, and a format of data outputted from the AV input source.

In addition, a user interface 28 receives a user's command, and transmits the user's command to the controller 27. The user interface 28 may be a remote controller or a key panel of the display device. The memory 26 stores the representative identifications of the AV input sources, and/or the system information of the AV input sources.

A signal processor 23 receives the AV signal outputted from the audio/video switch 22, and converts the signal to image and sound. That is, the signal processor 23 divides the received signal into a video signal and an audio signal, and it converts the video signal to a displayable image signal and converts the audio signal to a signal suitable for being outputting through a speaker 24. The signal processor 23 may include a video processor and an audio processor in order to perform these functions.

The display device according to the present invention includes a plurality of input terminals connected with the external AV input sources. For example, the display device according to the present invention, includes at least one of a video input terminal, a component input terminal, and an RGB input terminal, at the rear thereof, and includes a front input terminal at the front thereof. The input terminals are respectively connected with the external AV input sources, and the input terminals transmit the signals outputted from the external input sources to the audio/video switch 22.

Figure 2:
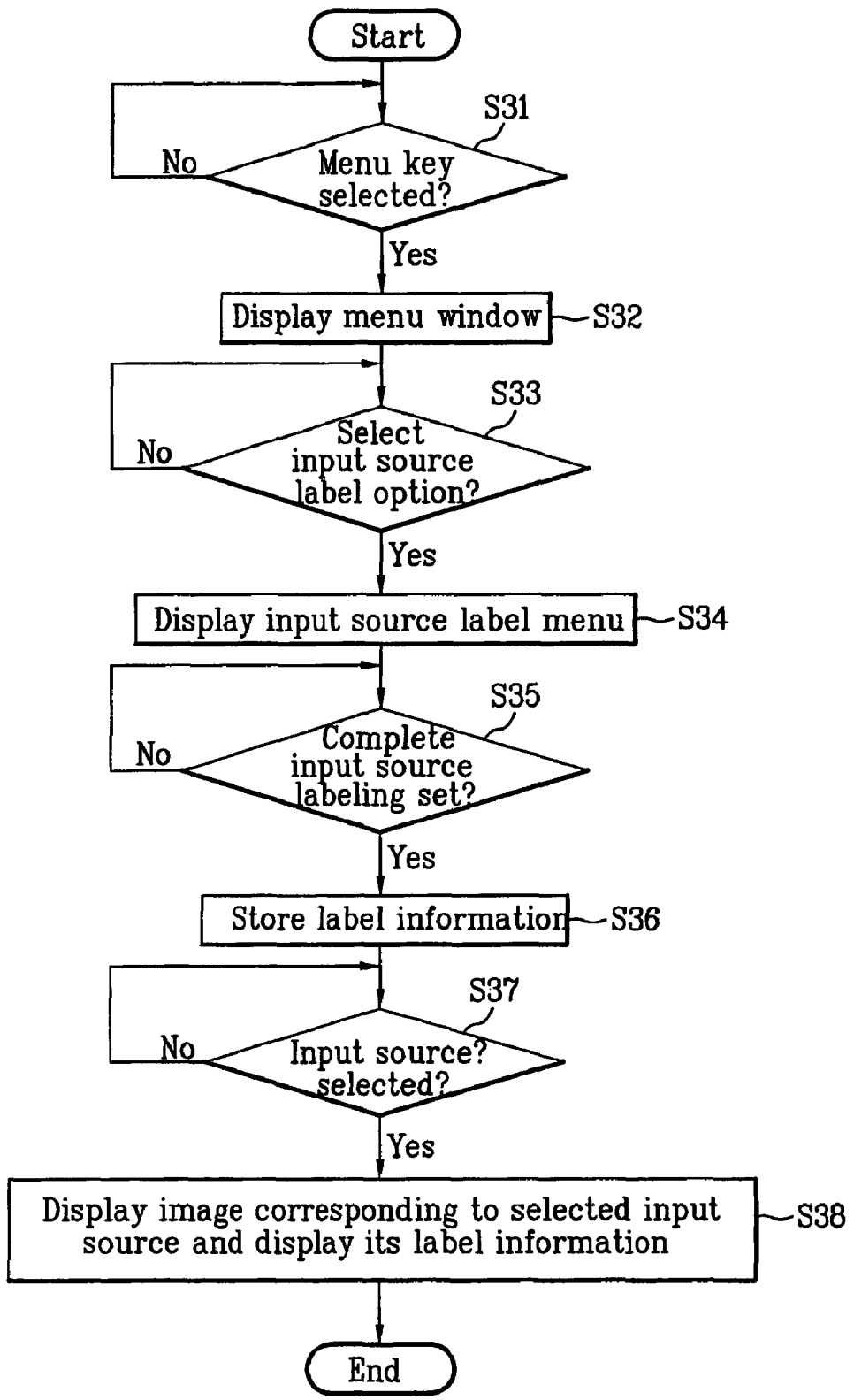
FIG. 2 illustrates a flow chart of showing an input source labeling method according to the present invention.

An AV input source labeling method according to the present invention will be described as follows. FIG. 2 illustrates a flow chart of illustrating the AV input source labeling method according to the present invention.

The controller 27 determines whether the user selects a menu key of the user interface 28 (S31). In this case, if the user selects the menu key, a menu window of an OSD (on screen display) type is displayed (S32).

Next, the controller 27 determines whether the user selects an option (Aux. Label) for labeling the AV input sources connected to the display device from the menu window (S33). If the user selects the option (Aux. Label), the controller 27 reads input terminal information stored in the memory 26. The input terminal information includes titles of the input terminals, a data format suitable for the input terminals, and a kind of the external AV input sources suitable for the input terminal.

Figure 3:
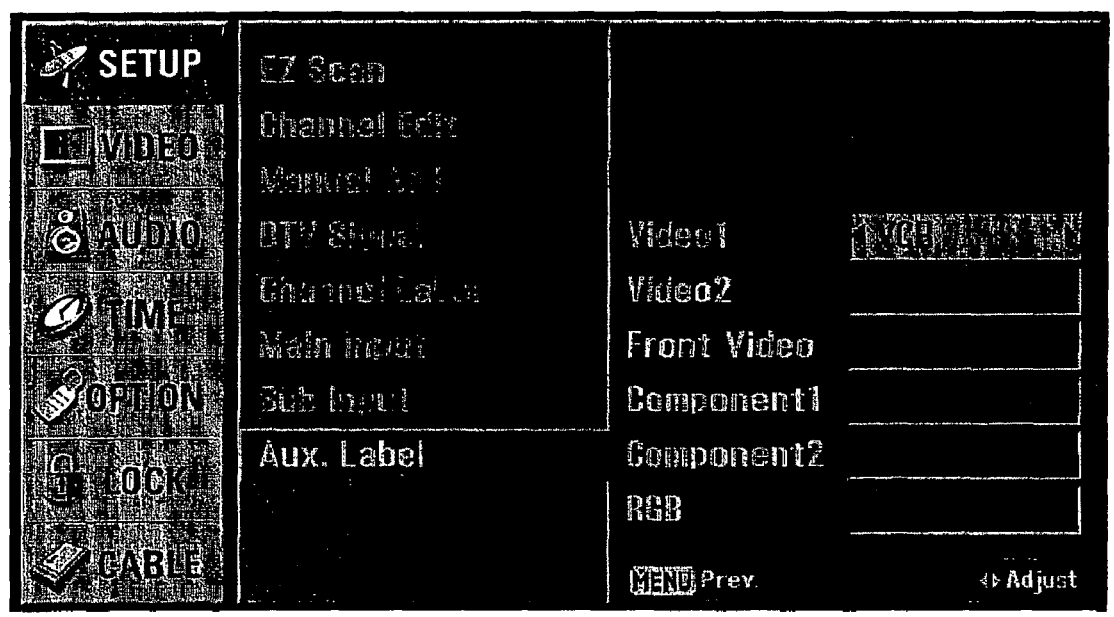
FIG. 3 and FIG. 4 illustrate input source label menu for selecting or inputting IDs corresponding to input sources.

After selecting the option (Aux. Label) for labeling the input sources, as illustrated in FIG. 3, the controller 27 displays an input source label menu on a screen. The input source label menu includes a list of options for selecting one of pre-stored representative identifications of the AV input sources corresponding to the input terminals and an input field for manually inputting the representative identifications of the AV input sources corresponding to the input terminals. For example, the input source label menu includes a list of the input terminals such as a video 1, a video 2, a front video, a component 1, a component 2, and an RGB, and also includes the option list for selecting the external AV input sources (VCR, cable box, game, DVD, set-top box, computer, etc.). Also, the controller 27 may display the input terminal information.

Figure 4:
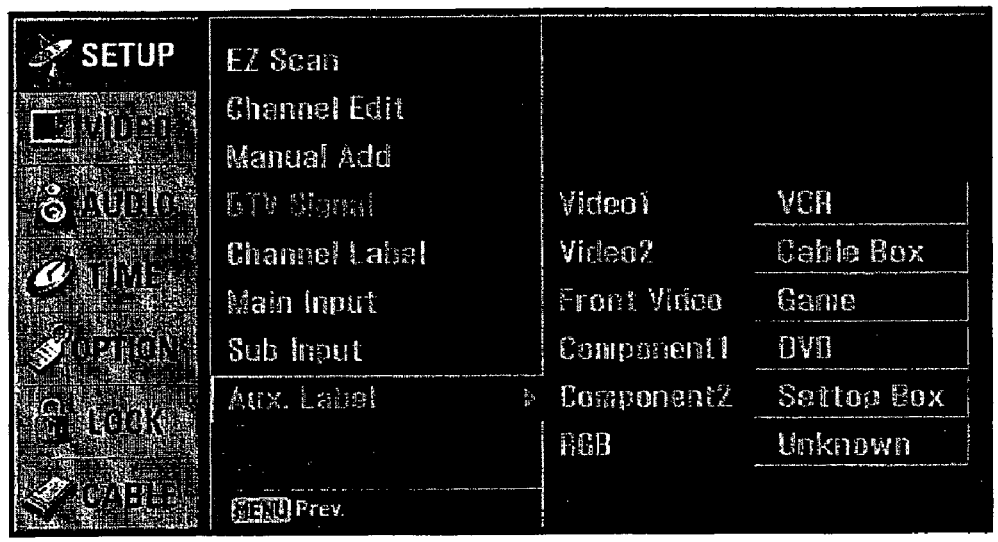

FIG. 4 illustrates the representative identifications selected or inputted for each AV input source. Referring to FIG. 4, it is possible for the user to select or input the representative identifications corresponding to the input terminals on the input source label menu by using the remote controller or the key panel of the display device. Also, the user may input the system information of the AV input sources by using the input source label menu. The system information of the AV input sources includes the class of the external device, the name of manufacturing company, the serial number, and the format of data outputted from the AV input sources.

On selecting the representative identifications of the AV input sources (S36), the user selects an option (Menu Prev.) for storing the selected representative identifications of the AV input sources and the system information of the AV input sources. After selecting the option (Menu Prev.), the controller 27 generates label information inclusive of the representative identifications and the system information of the AV input sources, and then stores the label information in the memory 26 (S36).

Figure 5:
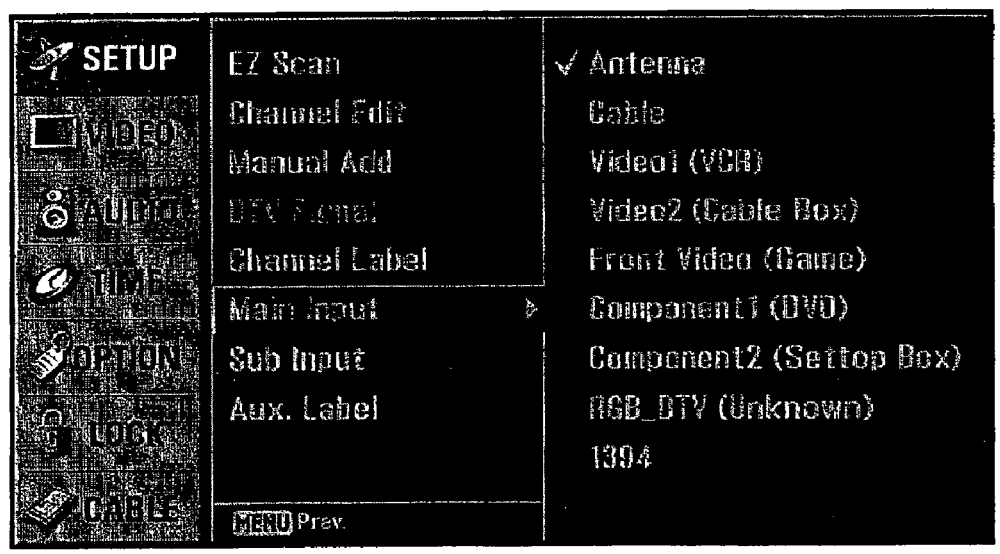
FIG. 5 illustrates a menu including a list of labeled input sources.

As described above, after labeling the AV input sources, the user may check or change the labeled AV input sources. If the user selects a main input option, the controller 27 reads the label information stored in the memory 26, and then displays a list of the labeled AV input sources on the screen, on the basis of the label information, as shown in FIG. 5.

Figure 6:
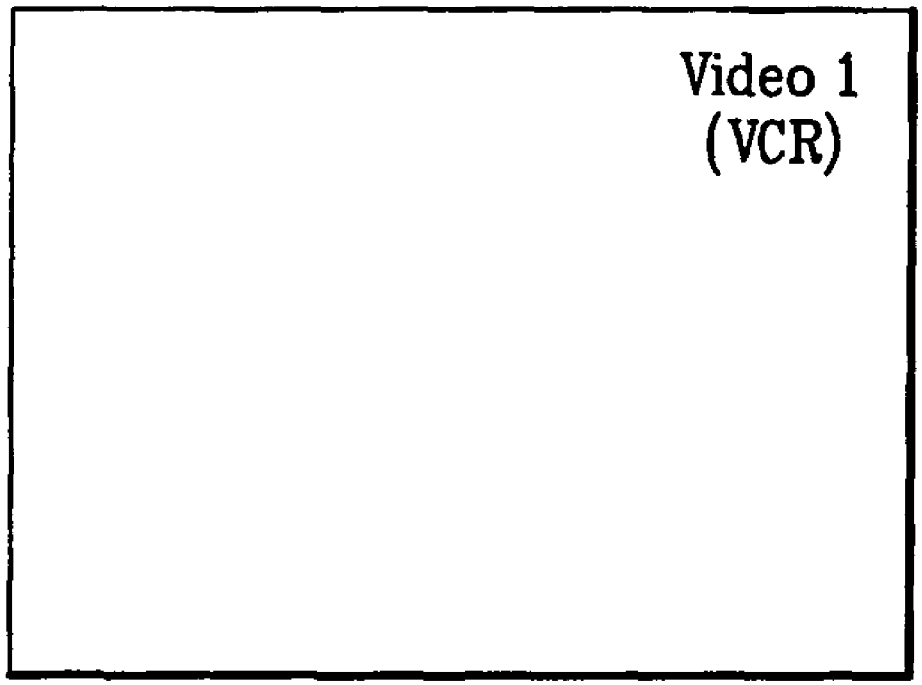
FIG. 6 illustrates a screen on which a labeled input source is displayed.

After labeling the AV input sources, the user may change the AV input sources providing the A/V signal during watching broadcasting. For example, the user selects the menu key of the user interface 28, as shown in FIG. 5, the controller 27 displays the list of the labeled AV input sources on the screen. Then, if the user selects one desirable AV input source from the list of the labeled AV input sources (S37), as shown in FIG. 6, the controller 27 displays the image outputted from the selected AV input source on the screen, and simultaneously, displays the representative identification (VCR) of the selected AV input source corresponding to the input terminal (Video 1) on one portion of the screen (S38). In this state, the corresponding input terminal (video 1) and the system information of the selected AV input source are also displayed on the screen. The representative identification (VCR) of the selected AV input source may be displayed on the screen during a predetermined time period, or may be displayed on the screen during an entire time period for displaying the image of the selected AV input source. If the representative identification of the AV input source is not displayed on the screen during playing the image of the selected AV input source, the user may select a confirmation key in order to display the representative identification of the selected AV input source on the screen.

Also, the user may use a hot key of the user interface 28 in order to display the representative identifications of the AV input sources along with the images of the AV input sources in sequence on the screen.

As described above, the display device and the method for labeling the AV input sources according to the present invention have the following advantages.

In the display device according to the present invention, the user can select the representative of the external AV input sources corresponding to the input terminal, and then the representative is stored in the memory. Accordingly, the user can identify the external AV input sources corresponding to the input terminals with easiness, and select the image of the desirable AV input source.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a plurality of input terminals respectively connected to a plurality of input sources;
a memory unit configured to store an input source label menu that designates the plurality of input terminals;
a controller configured to determine whether a user makes a selection corresponding to one of the input terminals on the input source label menu; and
a display unit configured to display on a screen the input source label menu for labeling input sources corresponding to the input terminals,
wherein the input source label menu includes or is displayed in association with:
a list of options to allow for selection of one of a plurality of pre-stored representative identifications that corresponds to a respective one of the input sources, and
a plurality of input fields provided for respective ones of the input terminals designated in the input source label menu, each input field receiving a selection of one the representative identifications of the input sources, and
wherein, when the user selects one of the pre-stored representative identifications from the list for one of the input terminals, the display unit displays a name of the selected pre-stored representative identification in association with a name of said one of the input terminals in the input source label menu for a predetermined time period, and wherein:
the controller controls display of a main input menu listing the input terminals and corresponding ones of the input sources,
an image from one of the input sources or input terminals selected from the main input menu is displayed simultaneously with a name of the input source and a name of the input terminal corresponding to the selection made from the main input menu, and
the main input menu is not displayed when the image and names of the input source and input terminal are simultaneously displayed.

2. The display device as claimed in claim 1, wherein the display unit further displays system information corresponding to the representative identification of at least one of the input sources in the input source label menu, wherein the system information includes at least one of information indicative of a manufacturer of a corresponding input source, a serial number, or a format of data to be outputted from a corresponding one of the input sources.

3. The display device as claimed in claim 1, wherein the memory unit stores input terminal information.

4. The display device as claimed in claim 3, wherein the input terminal information includes at least one of titles of the input terminals, a data format suitable for each of the input terminals, or a kind of the input sources suitable for each of the input terminals.

5. The display device as claimed in claim 1, further comprising
a switch for selecting one of signals received from the input sources.

6. The display device as claimed in claim 1, further comprising
a signal processor for converting an image of an input source selected by the user and the determined the representative identification of the selected input source into a displayable signal.

7. A display device comprising:
a plurality of input terminals respectively connected to a plurality of input sources;
a display unit configured to display on a screen an input source label menu for labeling the plurality of input sources;
a controller for setting representative identifications (IDs) of the plurality of input sources corresponding to the plurality of input terminals; and
a memory configured to store the input source label menu, wherein the controller controls the display unit to display the input source label menu for labeling the input sources,
wherein the input source label menu includes:
a list of options to allow for selection of one of the stored representative identifications for each of the input terminals, and
a plurality of input fields provided for respective ones of the input terminals, each input field receiving a selection of one of the stored representative identifications in the list, and
wherein, when the user selects one of the stored representative identifications from the list for one of the input terminals, the display unit displays a name of the selected representative identification in association with a name of the one of the input terminals in the input source label menu for a predetermined time period, and wherein:
the controller controls display of a main input menu listing the input terminals and corresponding ones of the input sources,
an image from one of the input sources or input terminals selected from the main input menu is displayed simultaneously with a name of the input source and a name of the input terminal corresponding to the selection made from the main input menu, and
the main input menu is not displayed when the image and names of the input source and input terminal are simultaneously displayed.

8. The display device as claimed in claim 7, wherein the input source label menu further includes system information that corresponds to at least one of manufacturer of the input source, serial number, or a format of data outputted from the input source.

9. The display device as claimed in claim 7, wherein the memory stores input terminal information.

10. The display device as claimed in claim 9, wherein each of the representative identifications includes at least one of a title of one of the input sources, a data format suitable for one of the input sources, or a kind of one of the input sources suitable for a corresponding one of the input terminals.

11. The display device as claimed in claim 8, wherein the controller is configured to change the representative IDs of the input sources and the system information, on the input source label menu.

12. The display device as claimed in claim 11, wherein each input field in the input source label menu allows a user to manually input a corresponding representative identification of one of the input sources, wherein the manually input representative identification is different from pre-stored information and includes a textual description of said one of the input sources.

13. A method for labeling input sources comprising:
pre-storing representative identifications for a plurality of input sources in a memory of a display unit;
displaying an input source label menu for labeling the plurality of input sources on a screen, the input source label menu including a plurality of input fields and a list of options to allow for selection of one of the pre-stored representative identifications for each of a plurality of input terminals, wherein each field receives a selection of one of the pre-stored representative identifications for a corresponding one of the input terminals;
storing the selected representative identification corresponding to each of the input terminals;
displaying a list of the stored representative identifications corresponding to the input terminals or input sources in the input source label menu or a main input menu, wherein, when the user selects one of the input sources or input terminals in the input source label menu or said main input menu, the display unit displays an image from the selected input source or input terminal,
displaying a name of the representative identification and a name of the input source or input terminal corresponding to the selected input source or input terminal simultaneously with the image,
wherein the name of the representative identification and the name of the input source or input terminal corresponding to the selected input source are displayed with the image for a predetermined period of time, and
wherein an image from one of the input sources or input terminals selected from the main input menu is displayed simultaneously with a name of a representative identification and a name of the input terminal corresponding to the selection made from the main input menu, and
wherein the main input menu is not displayed when the image and the names of the representative identification and input terminal are simultaneously displayed.

14. The method of claim 13, wherein each input field is configured to allow the user to manually input a representative ID of a corresponding one of the input sources, the manually input representative ID is different from pre-stored information and includes a textual description of said at least one of the input sources.

15. The method of claim 13, wherein the input source label menu further includes system information that corresponds to at least one of a manufacturer of the input source, a serial number, or a format of data outputted from one or more of the input sources.

16. The method of claim 13, wherein the input source label menu includes information on the input terminals.

17. The method of claim 16, wherein the input terminal information includes at least one of titles of the input terminals, a data format-suitable for each of the input terminals, or a kind of the input sources suitable for each of the input terminals.

18. The display device as claimed in claim 1, wherein the each representative identification includes at least one of a title of a corresponding one of the input terminals, a data format suitable for a corresponding one of the input terminals, or a kind of the input source of a corresponding one of the input terminals.

19. The display device of claim 1, wherein the display unit displays the input source label menu that includes information indicative of the input terminals, representative identifications indicative of the input sources coupled to the input terminals respectively, and system information corresponding to each of the input sources.

20. The display device of claim 19, wherein the system information includes at least one of manufacturer identification information or serial number information.

21. The display device of claim 1, wherein the representative identification of the selected input source is displayed on the screen during an entire time period for displaying the image of the selected input source.

22. The display device of claim 1, wherein the controller is configured to determine whether a user selects a confirmation key in order to display the representative identification of the selected input source on the screen.

23. The display device as claimed in claim 1, wherein the names of the input source and input terminal are displayed for a predetermined period of time after the selection from the main input menu is displayed, and then is not displayed after the predetermined period of time expires.

24. The display device as claimed in claim 7, wherein the names of the input source and input terminal are displayed for a predetermined period of time after the selection from the main input menu is displayed, and then is not displayed after the predetermined period of time expires.

25. A display device for labeling input sources comprising:
a plurality of input terminals respectively coupled to a plurality of input sources; and
a controller to control display of a main input menu listing the input terminals and corresponding ones of the input sources,
wherein an image from one of the input sources or input terminals selected from the main input menu is displayed simultaneously with a name of the input source and a name of the input terminal corresponding to the selection made from the main input menu, and
wherein the main input menu is not displayed when the image and names of the input source and input terminal are simultaneously displayed.

26. The display device as claimed in claim 25, wherein the names of the input source and input terminal are displayed for a predetermined period of time after the image corresponding to the selection from the main input menu is displayed, and then is not displayed after the predetermined period of time expires.

* * * * *